No. 733,268. PATENTED JULY 7, 1903.
C. L. POILLON.
TRAY CARRIER.
APPLICATION FILED NOV. 29, 1902.
NO MODEL.
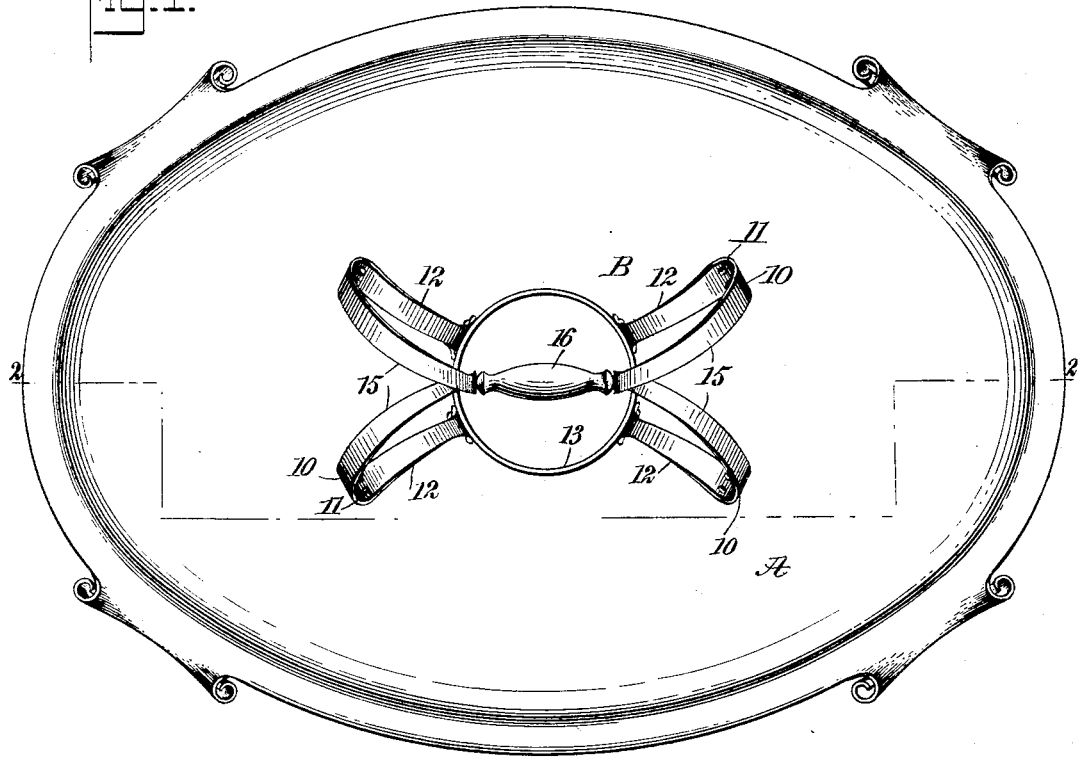
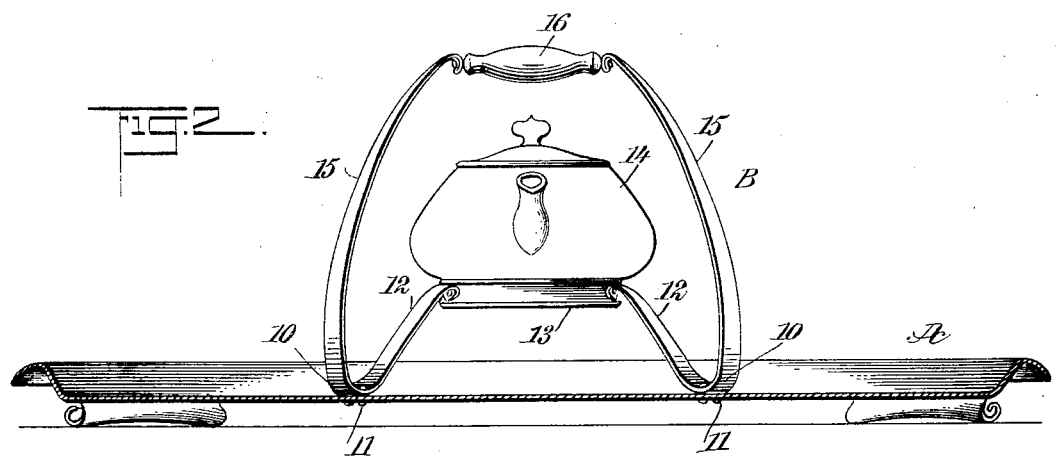
WITNESSES:
INVENTOR
Clara L. Poillon
BY
ATTORNEYS.

No. 733,268. Patented July 7, 1903.

UNITED STATES PATENT OFFICE.

CLARA LOUISE POILLON, OF NEW YORK, N. Y.

TRAY-CARRIER.

SPECIFICATION forming part of Letters Patent No. 733,268, dated July 7, 1903.

Application filed November 29, 1902. Serial No. 133,202. (No model.)

*To all whom it may concern:*

Be it known that I, CLARA LOUISE POILLON, a citizen of the United States, and a resident of the city of New York, borough of Manhattan, in the county and State of New York, have invented a new and Improved Tray-Carrier, of which the following is a full, clear, and exact description.

My invention relates to a center handle attachment for trays, whereby the tray may be centrally supported and conveniently carried by one hand and so balanced while being carried that the liability of the dishes or material shifting thereon will be reduced to a minimum.

A further purpose of the invention is to so construct the handle that it will support a ring, band, or socket above the tray, in which ring, band, or socket a teapot or a coffee-pot may be placed which it is desirable to keep warm, as an alcohol-stove or other heating medium may be placed upon the tray beneath the said band, ring, or socket.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a plan view of the tray and center handle therefor; and Fig. 2 is a section taken practically on the line 2 2 of Fig. 1.

A represents a tray, which may be of any desired shape, decorated or plain; and B represents the center handle for the tray, whereby said tray is carried. This center handle consists of a series of strap members, usually four, grouped in pairs, a pair being at each side of the center of the tray, and each strap member is bent upon itself to form a bottom loop 10. The loops 10 in the said strap members of the handle are secured to the upper face of the tray by rivets 11 or by equivalent means. From the loop portions 10 of the strap members of the handle sections 12 are bent upwardly within the circle upon which the loop-sections are secured, and these upwardly and inwardly extending lower sections 12 of the strap members of the handle B are secured to a ring, band, or socket 13, which is adapted to receive a teapot 14, a coffee-pot, or other vessel which it may be desirable to keep heated, as in practice an alcohol-lamp or other heating medium may be placed upon the tray beneath the said socket 13. The upper sections 15 of the handle members extend from the loop-sections 10 upwardly and practically in direction of the sides of the socket 13 over said socket, and the upper sections of each pair of strap members of the handle B are connected in any suitable or approved manner and are attached to a bar 16 or its equivalent, which extends over the aforesaid socket 13 centrally of the said tray and preferably longitudinally thereof when the tray is of oblong form, as illustrated. Under this construction it will be observed that the tray is centrally supported by means of the above-described centrally-located handle, and therefore the tray can be carried by one hand in a convenient manner and can be perfectly balanced. Furthermore, it is obvious that a teapot or other article may be carried in the said socket 13 and be kept heated, the dishes being suitably arranged around the handle.

I desire it to be understood that any suitable number of handle members may be employed and that the upper sections of the handle members may be of a pliable material, although, as illustrated, the members of the handle are usually made from thin steel or a suitable metal.

Having thus described my invention, I claim as new and desire to secure by Letters Patent—

1. In a tray, the combination of a base, upwardly-extending members secured thereto at points intermediate their ends, a handle supported by the upper ends of the members, and utensil-supporting means mounted on the lower ends of the members, substantially as set forth.

2. In a tray, the combination of a base, members bent at points intermediate their length and secured to the tray at their bent portions, a handle carried by said members, and utensil-supporting means mounted on the members below the handle, substantially as set forth.

3. A tray provided with a central handle comprising a series of members secured to the upper surface of the tray, having sections upwardly and inwardly directed, a socket secured to the said sections of the handle members, and outer sections which are bowed upwardly from the point of attachment to the tray over the said socket, the several members being connected at a point above the said socket, for the purposes described.

In testimony whereof I have signed my name to this specification in the presence of two subscribing witnesses.

CLARA LOUISE POILLON.

Witnesses:
 HOWARD A. POILLON,
 C. POILLON.